(12) United States Patent
Gerloff

(10) Patent No.: US 8,222,550 B2
(45) Date of Patent: Jul. 17, 2012

(54) ELECTRIC THERMOSTAT FITTING CONTROL SWITCH FOR ACTUATING THE FITTING

(76) Inventor: Michael Gerloff, Eschwege (DE)

( * ) Notice: Subject to any disclaimer, the term of this patent is extended or adjusted under 35 U.S.C. 154(b) by 288 days.

(21) Appl. No.: 12/525,100

(22) PCT Filed: Jan. 17, 2008

(86) PCT No.: PCT/EP2008/000315
§ 371 (c)(1),
(2), (4) Date: Mar. 11, 2010

(87) PCT Pub. No.: WO2008/092569
PCT Pub. Date: Aug. 7, 2008

(65) Prior Publication Data
US 2010/0170772 A1    Jul. 8, 2010

(30) Foreign Application Priority Data

Feb. 2, 2007 (EP) .................................. 07002283
Sep. 29, 2007 (EP) .................................. 07019215

(51) Int. Cl.
*H01H 9/00* (2006.01)
(52) U.S. Cl. .................. 200/293; 200/294; 200/295
(58) Field of Classification Search .......... 200/293–296, 200/302.1, 302.2; 248/27.1, 58, 60, 450, 248/560, 603, 634, 635; 361/807–811, 837; 73/632, 866.5; 349/58; 445/24
See application file for complete search history.

(56) References Cited

U.S. PATENT DOCUMENTS

| | | | |
|---|---|---|---|
| 3,297,916 A * | 1/1967 | Wright .......................... | 361/710 |
| 3,549,828 A * | 12/1970 | Lang ............................. | 381/322 |
| 3,737,670 A * | 6/1973 | Larson .......................... | 307/116 |
| 4,083,332 A * | 4/1978 | Neveux ........................ | 123/41.15 |
| 5,004,879 A * | 4/1991 | Bernhardt et al. ............. | 200/295 |
| 5,039,853 A * | 8/1991 | Blake et al. .................. | 250/239 |
| 5,291,068 A * | 3/1994 | Rammel et al. ............... | 307/116 |
| 5,829,072 A * | 11/1998 | Hirsch et al. .................... | 4/605 |
| 5,909,008 A * | 6/1999 | Pelaez ........................ | 174/138 G |
| 7,804,034 B2 * | 9/2010 | Herzog et al. ................. | 200/296 |
| 2001/0044954 A1 * | 11/2001 | DiCarlo .......................... | 4/675 |
| 2004/0168518 A1 * | 9/2004 | Fukuda et al. .................. | 73/632 |
| 2004/0182132 A1 * | 9/2004 | Head ............................. | 73/23.2 |

FOREIGN PATENT DOCUMENTS

| | | |
|---|---|---|
| DE | 19710800 A1 | 10/1998 |
| FR | 2877779 A1 | 5/2006 |
| GB | 2311723 A | 10/1997 |
| GB | 2413956 A | 11/2005 |
| WO | WO-2006115593 A2 | 11/2006 |

* cited by examiner

*Primary Examiner* — Michael Friedhofer
(74) *Attorney, Agent, or Firm* — Gifford, Krass, Sprinkle, Anderson & Citkowski, P.C.

(57) ABSTRACT

The subject matter of the invention is an electric thermostat fitting control switch (10) for actuating the fitting. The switch (10) can be mounted in a bore (4) in a lining element, for example of a washstand or wall. The switch (10) is held in the bore (4) by the holder designed as a pad (30) firmly secured in the bore (30a) of the lining element.

7 Claims, 3 Drawing Sheets

ELECTRIC THERMOSTAT FITTING CONTROL SWITCH FOR ACTUATING THE FITTING

CROSS-REFERENCE TO RELATED APPLICATIONS

Figure 1:
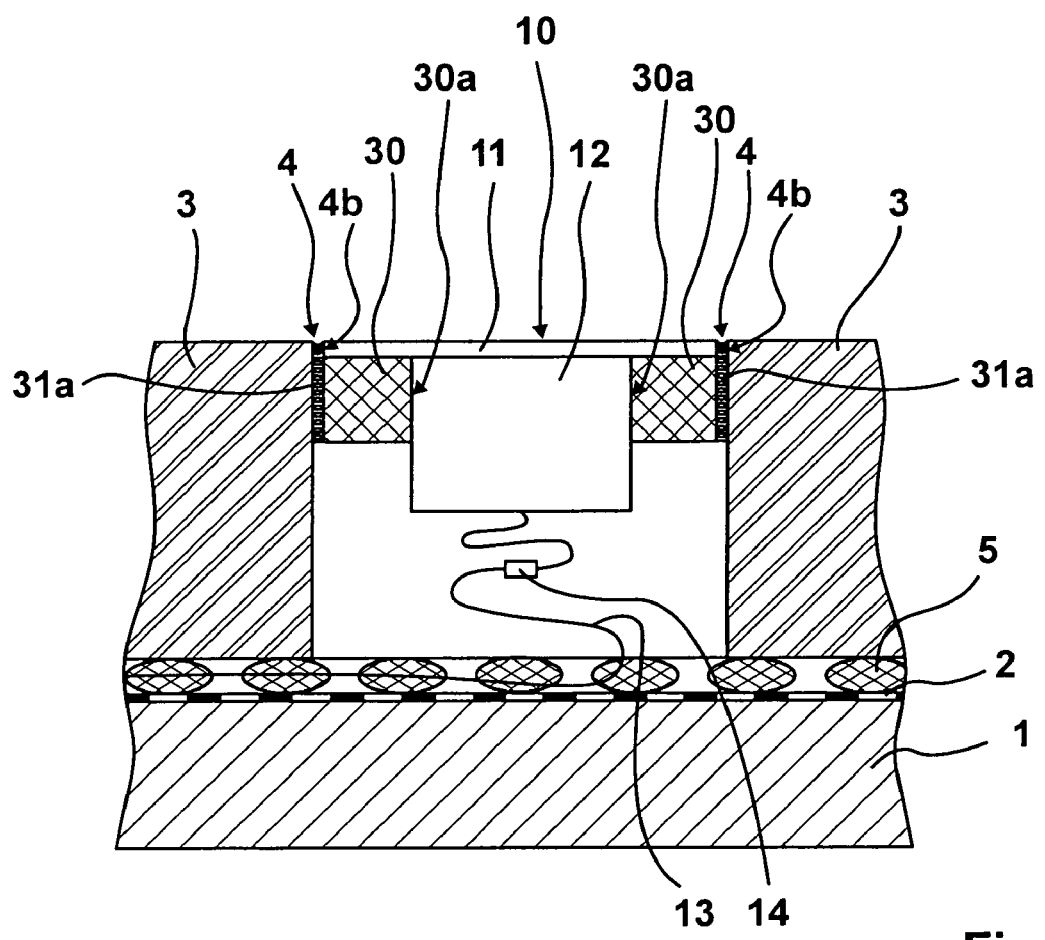

This application is the U.S. national phase of PCT/EP2008/000315 filed Jan. 17, 2008, which claims priority of European Patent Application No. 07002283.5 filed Feb. 2, 2007 and European Patent Application No. 07019215.8 filed Sep. 29, 2007.

The present invention relates to an electric thermostat fitting control switch for actuating said fitting.

A thermostat fitting, which communicates with a fitting discharge body, is known from DE 197 10 800 A1, said thermostat fitting comprising an inlet for warm water and one for cold water. There moreover exists a valve system for mixing and stopping the flows of hot and cold water supplied through the inlets. The valve system for mixing and stopping incorporates an electric motor for a respective one of the flows of cold and warm water, one outlet for the water being moreover provided, which communicates with the outlet body of the fitting. This thermostat fitting as a surface-mounted unit has a control panel and may be covered with the help of a domed flap. Various buttons are provided on the control panel in order to determine, i.a., the flow rate and the temperature of the water flowing to the outlet body of the fitting. The entire apparatus is of a very voluminous construction and has not established itself in modern bathrooms as a result thereof.

Modern bathrooms are substantially characterized by smooth surfaces in which even the outlet bodies of the fitting are hardly visible. Showers e.g., are known in which the head shower is integrated in the ceiling. Insofar, surface-mounted fittings as they are known from DE 197 10 800 A1 would compromise the general aesthetics. Even the fittings of glass walls and doors of a shower are minimized to such an extent that such an item seems to float in the room. The same applies to the shower floor, which is no longer configured as the actual shower tub but only as a planar surface with an annular outlet that is surrounded by the corresponding glass wall.

As already explained, the thermostat fitting as a surface-mounted unit as described in the document DE 197 10 800 A1 is far too voluminous. Insofar it is already known to dispose the control system in the form of singular switches directly on the outlet body of the fitting.

In this context, a shower device is e.g. known, which incorporates a surface-mounted housing with an outlet body of the fitting disposed at the upper end as the head shower. On the side of the surface-mounted housing there is located the hand shower and on the front of the housing there is located the control device in the form of singular switches for actuating the shower device. A minimalistic design such as by embedding a head shower in the ceiling cannot be realized herewith.

Furthermore, a surface accommodating such type switches, e.g., in the form of push-buttons, must be easy to clean. Moreover, it is to be ensured that, if such switches are for example arranged in a wall, for example in a shower wall, possibly penetrating water will not cause any damage. As already mentioned, the switches should be arranged and designed so as to be or at least to possibly be an integral component part of the design of a bathroom item such as a shower.

In summary, this means that prior art offers on the one side voluminous thermostat fittings as surface-mounted units which show a control panel for actuating spatially separated outlet bodies of a fitting. On the other side, prior art offers, e.g., for showers, surface-mounted housings having at their upper end an angled outlet body of a fitting as a head shower, which is actuated through switches on the housing. No prior art document permits to realize a minimalistic design.

Switches of a control device by means of which a minimalistic design of bathroom items are to be realized are switches that are inconspicuous or that may act as a design item.

In order to meet these premises it must be made certain that such a switch can be disposed substantially or almost flush with the outer surface of the planar item, such as a wall or a level surface such as on a washbasin. This allows in particular to keep such an item clean very readily, with no protruding edges affecting the overall optical appearance of the item.

In this context, it is already known from GB 23 11 723 A to provide a housing for a washstand, the switches for actuating e.g., the water outlet being arranged with identical surface in the housing. The document does not explain how the switches are fixed in the housing.

In order now to flush-mount such a switch in a planar lining element of an item such as in a wall covering, in a partition wall, in a washstand plate, in a cover plate of a tub, and so on, there is provided, in accordance with the invention, that a bore is disposed in the lining element, the switch in the bore being accommodated in a mount configured like a pad so as to allow inspection, said pad being fixed in the bore of the lining element.

Expensive bathrooms in premium hotels are often made from natural stone, the walls e.g., being also lined with natural stone. Such type natural stone linings for walls have a thickness of 18 through 22 mm, the thickness being exactly determinable in advance, which involves considerable expense in terms of manufacturing though. Behind the layer of stone, for example of natural stone, there is a layer of sealant and a seal, a plasterboard wall, which must be protected against humidity, being often concealed behind the seal. The natural stone wall covering, which is configured as a lining, now comprises one or several openings and bores for accommodating one or more switches, the pad being bonded into the corresponding opening in the lining in such a manner that the switch, which is accommodated in the pad, is substantially flush with the outer surface of the wall. The pad has two effects, namely one of fixing it in the bore or opening on the one side and of ensuring the tightness in the transition between pad and wall of the bore in the lining element on the other side.

Other advantageous features will become apparent from the dependent claims.

There is in particular provided that the pad, which is made from an elastically resilient plastic material, comprises a bore for the switch. The switch, which is in particular configured to be a piezoelectric switch, has a switch body in the shape of a cylindrical ring and a plate projecting from the ring is provided on the upper side of the cylindrical ring. The switch has its switch body resting in the bore of the pad in such a manner that the plate rests on the pad. To fix the switch in the pad serving as the mount there is provided, according to a feature of the invention, that the switch body is pressed into the bore of the pad. This press-fit assembly is devised so that the switch can be pulled out of the bore in the pad in the event of an inspection.

If, depending on the material of the lining element, a mere adhesive bond with the pad should not be sufficiently stable, there is provided, in accordance with another feature of the invention, that the pad additionally rests on a support that is fastened in the bore of the lining element. Finally, said support serves to prevent the switch from being pushed through the bore under the action of excessive force. This means that the support constitutes, beside the adhesive bond of the pad in the bore of the lining element, an additional measure of fixing the switch in the bore if a mere adhesive bond cannot be ensured with sufficient solidity due to the specificity of the material.

According to another feature of the invention, the legs of the support, which is U-shaped in cross section, are provided with one wing each, which projects from both end sides, said wings engaging behind a recess in the bore of the lining element. The support also can be fixed by an adhesive bond in the bore of the lining element.

The invention will be explained in closer detail herein after by means of an assembly in a natural stone plate, with reference to the drawings.

Figure 2:
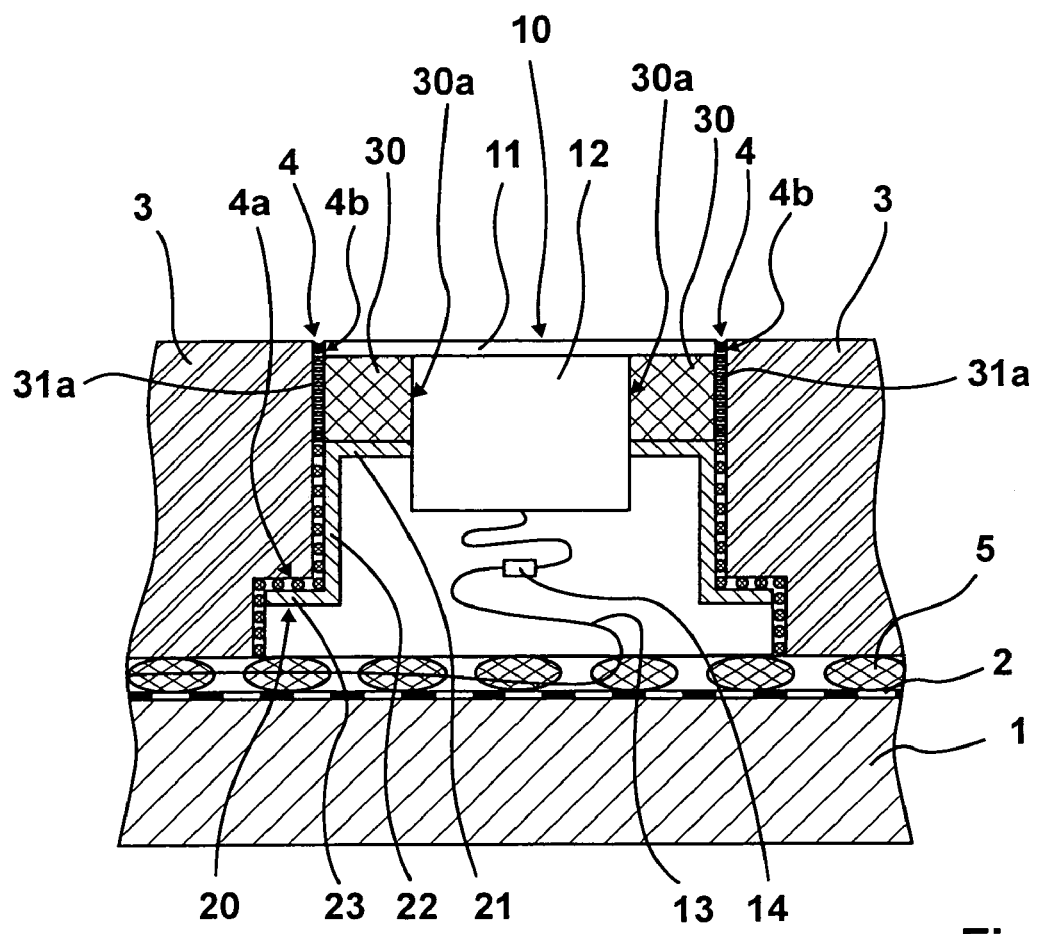
Figure 3:
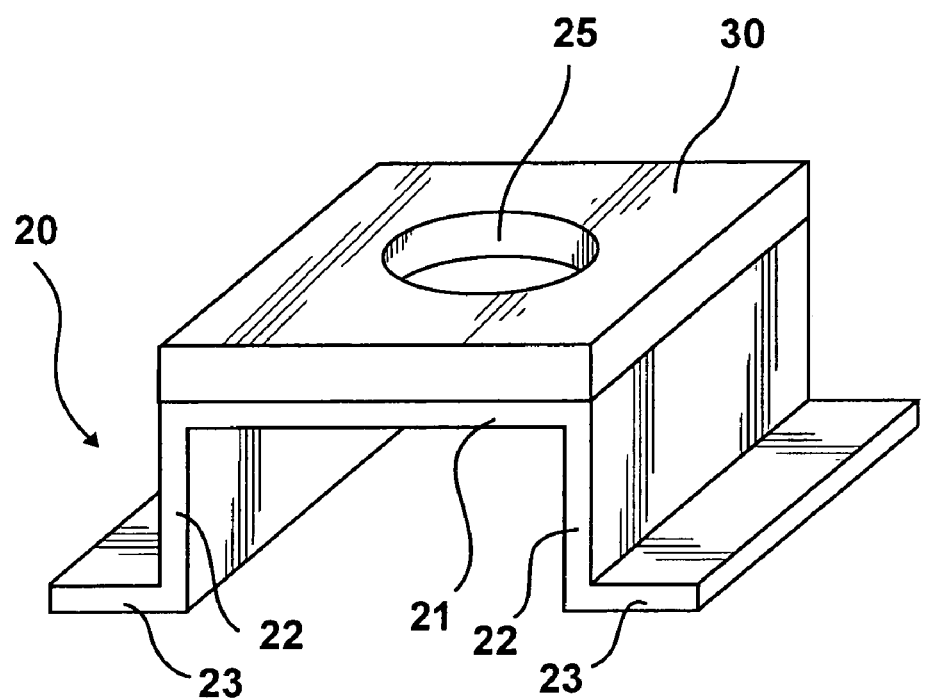

FIG. 1 schematically shows the switch in the mounted condition;

FIG. 2 schematically shows the switch in the mounted condition with an additional support;

FIG. 3 shows said support for receiving the switch in a perspective view.

As already explained, bathroom walls, in particular in hotels, often is consist of so-called plasterboard walls 1 on which there is located a seal 2 against penetrating humidity, a layer of sealant of about 5 mm thick being disposed on this seal 2, such as a foil, and a natural stone lining 3 being finally arranged thereon (in particular in premium bathrooms). In the region of the receptacle for the switch 10, the layer of natural stone 3 has a bore 4. In said bore 4 there is bonded the pad, which is labelled at 30 and is made from an elastic plastic material (FIG. 1). Insofar, the layer of sealant 31a is provided between the pad 30 and the wall of the natural stone layer 3. The switch body 12 of the switch 10 may be fixed by press-fitting it into the bore 30a of the pad 30. Through this press-fit connection, the switch can be readily exchanged in the event of an inspection. The press-fit connection however also ensures the necessary sealing against humidity. The plate 11 of the switch 10 rests on the pad 30 and is flush with the upper side of the layer of natural stone.

According to a variant (FIG. 2), the bore 4 is provided with an undercut 4a if there is additionally provided a support 20 for supporting the pad. The pad 30 serves for receiving the switch, which is generally indicated at 10, said pad being located above the support 20 and being at need—as already discussed—retained for support by the support. The support 20 is U-shaped in cross section and has a web 21 and two legs 22, each leg 22 comprising an outward projecting wing 23 at its end, as can be seen in particular from FIG. 2. On the web 21, the support 20 shows an opening 25 for receiving the switch 10, the pad 30 being moreover disposed on the web 21 of the support 20 and having a corresponding bore 30a for receiving the switch. Such a pad 30 is made from an elastic plastic material for the plate 11 of the switch 10 to rest on it.

The switch body 12 of the switch 10 extends through the bore 25 in the support and through the bore 30a of the pad 30, as this appears from FIG. 2. The switch body 12 comprises a cable 13 that can be connected through a plug 14 to a cable guided in the layer of sealant 5, said cable being led to the electrically actuatable, water-carrying thermostat fitting (FIG. 1, FIG. 2).

Referring to variant 2, the following applies with respect to mounting:

As already explained above, the thickness of natural stone plates always varies by some millimetres. In order to ensure that the switch 10 can always be substantially flush with the upper side of the natural stone surface whilst the construction of the support 20 for receiving the switch remains the same, the difference of up to 4 mm in the thickness of the natural stone slabs can be compensated for by depositing bulges of sealant mass of more or less thickness in the region of the wings 23 of the support. The support 20 is not only bonded to the natural stone slab in the region of the wings 23, but also to its legs 22. The pad 30 also serves for the purpose of sealing the bore and can be bonded at the side to the wall of the bore provided in the natural stone slab and receiving the switch. Thus, the switch 10 is only retained by the pad since said pad is bonded to the wall of the bore. In this case, the support 20 only serves for additionally securing the switch insofar as the sole adhesive bond between the pad and the bore, which can be achieved, cannot be made so as to be sufficiently stable.

The slot between the plate 11 of the switch 10 and the wall in the opening in the natural stone slab may be filled with silicone for example (arrow 4b) or it may stay open. What matters in this embodiment for receiving a switch is that the entire switch is located above the sealant, i.e., even if the seal at the switch is not operable for whatever reason no humidity would penetrate into the plasterboard wall. In none of the two variants, the switch 10 enters an adhesive bond with the pad 30; instead, it is releasably connected to the pad 30 through a press-fit connection so that the switch can be replaced in case of damage without the pad having to be removed from the bore. The seal occurs through the releasable press-fit connection between the switch body 12 and the elastic bore wall 30a of the pad 30.

The invention claimed is:

1. A switch for activating a control unit of an electric thermostat:
said switch being configured to be disposed in a bore of a lining element; said switch being retained in said bore by being press-fit into a mount comprising a pad which is carried on a support that is fastened in the bore, whereby said switch may he removed from said mount so as to allow inspection.

2. The switch as set forth in claim 1, characterized in that the support is bonded in the bore.

3. The switch as set forth in claim 1, characterized in that the pad consists of an elastically resilient plastic material.

4. The switch as set forth in claim 1, characterized in that the pad comprises a bore for the switch, said switch possessing a plate by which the switch rests on said pad.

5. The switch as set forth in claim 4, characterized in that the switch is press-fitted into the bore of the pad.

6. The switch as set forth in claim 1, characterized in that the leg of the support comprises a leg having at its end a wing, which projects therefrom.

7. A switch for activating a control unit of an electric thermostat:
said switch being, configured to he disposed in a bore of a lining element; said switch being retained in said bore by being press-fit into a mount comprising a pad which is fixed in the bore, wherein said, pad comprises a bore for the switch, and wherein said switch is press-fitted into the bore of the pad, said switch including a plate by which the switch rests on said pad, whereby said switch may be removed from said mount so as to allow inspection.

* * * * *

UNITED STATES PATENT AND TRADEMARK OFFICE
CERTIFICATE OF CORRECTION

| | | |
|---|---|---|
| PATENT NO. | : 8,222,550 B2 | Page 1 of 1 |
| APPLICATION NO. | : 12/525100 | |
| DATED | : July 17, 2012 | |
| INVENTOR(S) | : Michael Gerloff | |

It is certified that error appears in the above-identified patent and that said Letters Patent is hereby corrected as shown below:

In the Title Page:

(30) Foreign Application Priority Data

Delete "07002283" Insert -- 07002283.5 --

Delete "07019215" Insert -- 07019215.8 --

In the Specification:

At column 1, line number 27 Delete "ia.," Insert -- e.g., --

At column 3, line number 22 Delete "is"

At column 4, line number 38 Delete "he" Insert -- be --

At column 4, line number 54 After being Delete ","

At column 4, line number 57 After said Delete ","

Signed and Sealed this
Nineteenth Day of February, 2013

Teresa Stanek Rea
*Acting Director of the United States Patent and Trademark Office*